united States Patent Office
3,433,820
Patented Mar. 18, 1969

3,433,820
PREPARATION OF AROMATIC NITRILES FROM SUBSTITUTED BENZENES, HCN AND OXYGEN IN THE PRESENCE OF COPPER CYANIDE
Naoya Kominami, Tokyo, Hitoshi Nakajima, Urawa-shi, and Nobuhiro Tamura, Tokyo, Japan, assignors to Asahi Kasei Kogyo Kabushiki Kaisha, Osaka, Japan, a corporation of Japan
No Drawing. Filed Oct. 15, 1965, Ser. No. 496,664
Claims priority, application Japan, Nov. 7, 1964, 39/62,735
U.S. Cl. 260—465       10 Claims
Int. Cl. C07c 121/04, 121/02

ABSTRACT OF THE DISCLOSURE

A process for preparing aromatic nitriles by reacting lower alkyl or alkenyl benzene with HCN and an oxygen containing gas at a temperature of 300°–500° C. in the vapor phase. The reaction is catalyzed by copper cyanide or a copper compound which yields copper cyanide under the reaction conditions.

---

This invention relates to a process for producing aromatic nitriles by the vapor-phase catalytic reaction of an alkyl or alkenyl benzene with hydrogen cyanide and oxygen.

In a process for the production of aromatic nitriles using hydrogen cyanide as one of the starting materials there have been known those in which benzonitrile is obtained from benzene and hydrogen cyanide in the presence of chlorine (U.S. Patent No. 2,872,457), phthalonitrile is obtained from benzonitrile and hydrogen cyanide by the use of platinum, rhodium or palladium as catalyst (U.S. Patent No. 2,758,129), and benzonitrile is prepared from benzene and hydrogen cyanide by using as the catalyst, a noble metal of Group VIII of the Periodic Table (U.S. Patent No. 3,042,705). However, these methods have some drawbacks, that is, in the first method, undersirable chlorinated aromatic compounds are produced and in the second and third methods the yield of the aromatic nitriles obtained is low.

The present inventors attempted to produce aromatic nitriles by a method differing from those above in which method alkyl or alkenyl benzene is reacted with hydrogen cyanide and oxygen, and as a result, it has been found that when using a catalyst in such a method aromatic nitriles can be produced.

Accordingly, this invention provides a novel process for producing aromatic nitriles which comprises reacting lower alkyl benzenes or lower alkenyl benzenes with hydrogen cyanide and oxygen or molecular oxygen-containing gas by using a catalyst, said reaction being effected in the vapor phase at an elevated temperature.

Alkyl benzenes or alkenyl benzenes as the starting material used in the invention have one or two lower alkyl or lower alkenyl radicals such as methyl, ethyl, isopropyl or vinyl, and when the starting material has such two radicals, the radicals may be either the same or different. The products of the invention are benzonitrile, phthalonitrile, or mono-alkyl (or alkenyl) benzonitriles.

The method of the invention can be represented by the following equation:

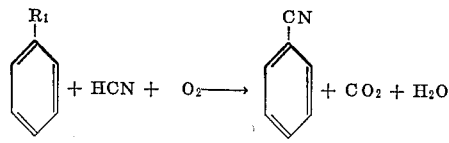

or

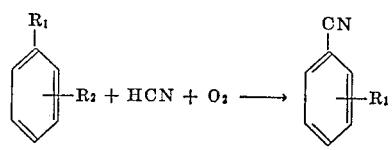

or

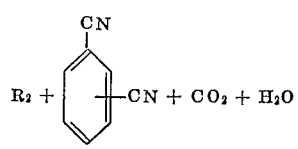

wherein $R_1$ and $R_2$ are independently selected from the group consisting of methyl, ethyl, isopropyl and vinyl radicals.

The catalyst used in the process of the invention is copper cyanide or copper compounds which yield in whole or in part copper cyanide under the reaction conditions. The compound which yield in whole or in part copper cyanide, include copper metal, copper oxide, copper nitrate, copper chloride, copper bromide, copper iodide, copper hydroxide and copper salts of organic acids.

In order to prepare the catalyst, any of the methods which are conventional in the art can be employed, such as the immersing, mixing and heating methods. Although the use of a carrier for the catalyst is preferred, it is not always necessary. The carrier may be any of the conventional ones in the art, and active carbon, silica, alumina and the like are preferred.

The reaction temperature used in carrying out the process may be from 150° C. to 600° C., and the preferred range is 300° C. to 500° C.

The space velocity used in the invention may be between 20/hour and 2000/hour.

Referring to the volume ratio of the gases used in the invention, the volume of hydrogen cyanide gas may be from $\tfrac{1}{20}$ to 20 volumes per volume of the lower alkyl or alkenyl benzene gas, and that of oxygen gas may be less than 1 volume per volume of the gas mixture of hydrogen cyanide and lower alkyl or alkenyl benzene.

The invention can be carried out under either atmospheric pressure or superatmospheric pressure.

As the molecular oxygen-containing gases, air or a mixture of oxygen and nitrogen or carbon dioxide may be employed.

The type of the reaction used in the invention may be either of fixed bed or of fluidized bed.

The following examples are illustrative of this invention.

EXAMPLE I

Copper cyanide was dissolved in aqueous ammonia solution, then to the solution was added granular active carbon followed by evaporating the mixture and drying on a water bath. The catalyst thus formed contained copper cyanide corresponding to 9.6 grams of copper metal per 100 ml. thereof. 40 ml. of the catalyst were placed in a Pyrex glass reaction tube having an outside diameter of 20 mm. and the tube was placed in a fused salt bath maintained at a temperature of 450° C. A gas mixture of toluene, hydrogen cyanide, oxygen and nitrogen, of which the volume ratio was 1:1:1:22, was charged to the tube at a space velocity of 150/hour. 1 hour after the commencement of the reaction, it was observed that the conversion of charged toluene was 17% and the yield of benzonitrile was 81% based on the converted toluene.

EXAMPLE II

A run was repeated by the same procedure as described in Example I, except that a mixture of p-xylene, hydrogen cyanide, air and nitrogen, of which the volume ratio was 1:2:5:42, was introduced at a spacevelocity of 150/hour into the reaction tube maintained at 420° C. 1 hour after the commencement of the charged reaction, the conversion of p-xylene was 15% and the converted p-xylene yielded phthalonitrile in 31% yield and tolunitrile in 28% yield.

EXAMPLE III 28 grams of copper oxide, 50 grams of silica gel for chromatography previously heat-treated at 1000° C. and 2 grams of bentonite were mixed, and the mixture was formed into a cylinder having a length of 2 mm. and a diameter of 2 mm. followed by drying at 100° C. over night. 20 ml. of the catalyst thus formed and placed in the reaction tube was maintained at 450° C., and a mixture of xylene, hydrogen cyanide, air and nitrogen in a volume ratio of 1:1:5:26 was introduced at a space velocity of 300/hour. 3 hours after the commencement of the reaction, ti was observed that the conversion of introduced xylene was 17% and the yield of phthalonitrile was 2% and that of tolunitrile was 31%, respectively, based on the converted xylene.

EXAMPLE IV 100 ml. of silica gel were added to an aqueous solution of 17 grams of cupric chloride and the mixture was evaporated and dried on a water bath. To 40 ml. of the catalyst thus prepared which was placed in a reaction tube maintained at 450° C. there was charged at a velocity of 420/hour, a mixture of styrene, hydrogen cyanide, air and nitrogen, in a volume ratio of 1:1:5:26. 3 hours after the commencement of the reaction, it was observed that the conversion of charged styrene was 22% and the yield of benzonitrile was 51% based on the converted styrene.

EXAMPLE V 8 grams of copper nitrate were dissolved in hot water, and granular alumina was added to the solution followed by evaporating the mixture and drying on a water bath. To 40 ml. of the catalyst maintained at 450° C. was charged a mixture of ethyl benzene, hydrogen cyanide, air and nitrogen, in a volume ratio of 3:3:15:79 at a space velocity of 270/hour. 6 hours after the commencement of the reaction it was observed that the conversion of charged ethyl benzene was 17% and the yield of benzonitrile was 29% based on the converted ethyl benzene.

EXAMPLE VI 8 grams of copper nitrate were dissolved in hot water, and 100 ml. of fuller's earth were added to the solution followed by evaporating the mixture and drying on the water bath. The catalyst thus prepared was reduced by heating in a stream of hydrogen at 110° C. for 5 hours and then at 200° C. for 3 hours. To 40 ml. of the catalyst maintained at 400° C. was charged a gas mixture of isopropyl benzene, hydrogen cyanide, air and nitrogen, in a volume ratio of 3:3:15:79, at a space velocity of 180/hour. 1 hour after the commencement of the reaction, it was observed that the conversion of charged isopropyl benzene was 11% and the yield of benzonitrile was 21% based on the converted isopropyl benzene.

EXAMPLE VII

A series of runs was conducted using, as catalyst, cupric bromide, copper iodide, copper hydroxide, copper acetate, copper formate and copper benzoate, respectively. The actual catalyst was made by supporting 0.2 gram-mol of each of the copper compound above mentioned on 100 ml. of various carriers. Gas mixtures of toluene, hydrogen cyanide, air and nitrogen, in a volume ratio of 4:4:220:72, were introduced at a space velocity of 150/hour into 40 ml. of the above catalysts maintained at the given temperature. The reaction results 3 hours after the commencement of the reaction are shown in the following table.

TABLE

| Run | Catalyst | Carrier | Temp. (° C.) | Conversion of toluene, percent | Yield of benzonitrile, percent |
|---|---|---|---|---|---|
| 1 [1] | Cupric bromide | Active carbon | 420 | 27 | 37 |
| 2 | Copper iodide | Alumina | 430 | 24 | 28 |
| 3 [2] | Cooper hydroxide | Silica gel | 500 | 38 | 27 |
| 4 | Copper acetate | Active carbon | 400 | 42 | 33 |
| 5 | Copper formate | Silica gel | 400 | 38 | 31 |
| 6 | Copper benzoate | Active carbon | 380 | 19 | 41 |

[1] 8% by volume of carbon dioxide was introduced.
[2] 1% by volume of steam was introduced.

What we claim is:
1. A process for producing benzonitrile, phthalonitrile, monoalkyl benzonitriles and monoalkenyl benzonitriles which comprises reacting in the vapor phase at a temperature of 300°–500° C. a lower alkyl benzene or a lower alkenyl benzene of the formulae

or

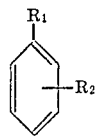

wherein $R_1$ and $R_2$ are independently selected from the group consisting of methyl, ethyl, isopropyl and vinyl, with hydrogen cyanide and a gas selected from the group consisting of oxygen and molecular oxygen containing gases in the presence of a catalyst selected from the group consisting of copper cyanide and copper compounds which yield copper cyanide under the reaction conditions.

2. The process according to claim 1, wherein the lower alkyl benzene is selected from the group consisting of toluene, xylene ethyl benzene, and isopropyl benzene.

3. The process according to claim 1, wherein the lower alkenyl benzene is styrene.

4. The process according to claim 1, wherein the copper compound is selected from the group consisting of copper metal, copper oxide, copper nitrate, copper chloride, copper bromide, copper iodide, copper hydroxide and copper formate acetate and benzoate.

5. The process according to claim 1, wherein the space velocity of the reactants is from 20/hour to 2000/hour.

6. The process according to claim 1, wherein the volume ratio of hydrogen cyanide gas to the lower alkyl benzene gas is from 1/20 to 1 to 20:1.

7. The process according to claim 1, wherein the volume ratio of hydrogen cyanide gas to the lower alkenyl benzene gas is from 1/20 to 1 to 20:1.

8. The process according to claim 1, wherein the volume ratio of oxygen to the gas mixture of lower alkyl benzene and hydrogen cyanide is less than 1:1.

9. The process according to claim 1, wherein the catalyst is supported on a carrier selected from the group consisting of active carbon, silica and alumina.

10. The process according to claim 1, wherein the molecular oxygen containing gas is selected from the group consisting of mixtures of oxygen and nitrogen and air and nitrogen.

References Cited

UNITED STATES PATENTS

| | | | |
|---|---|---|---|
| 2,447,600 | 8/1948 | Schulze et al. | 260—465 X |
| 2,780,637 | 2/1957 | Toland | 260—465 |
| 3,009,942 | 11/1961 | Klein et al. | 260—465 |

OTHER REFERENCES

Chemical Abstracts, volume 44, p. 8204a.

CHARLES B. PARKER, *Primary Examiner.*

S. T. LAWRENCE III, *Assistant Examiner.*